(12) United States Patent
Kozarekar et al.

(10) Patent No.: US 7,175,555 B2
(45) Date of Patent: Feb. 13, 2007

(54) HYBRID AUTOMOTIVE POWERTRAIN WITH TORSIONAL VIBRATION DAMPER

(75) Inventors: Shailesh S. Kozarekar, Novi, MI (US); Joseph Supina, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 587 days.

(21) Appl. No.: 10/707,594

(22) Filed: Dec. 23, 2003

(65) Prior Publication Data

US 2004/0112654 A1    Jun. 17, 2004

Related U.S. Application Data

(63) Continuation-in-part of application No. 10/063,196, filed on Mar. 28, 2002, now abandoned, and a continuation-in-part of application No. 10/463,046, filed on Jun. 17, 2003, now abandoned.

(51) Int. Cl.
*B60K 6/02* (2006.01)
(52) U.S. Cl. .......................................................... 475/5
(58) Field of Classification Search ..................... 475/5
See application file for complete search history.

(56) References Cited

U.S. PATENT DOCUMENTS

| | | | |
|---|---|---|---|
| 2,331,160 A | 10/1943 | Baker | |
| 3,959,990 A | 6/1976 | Golitz | |
| 4,041,801 A | 8/1977 | Anderson | |
| 4,141,425 A | 2/1979 | Treat | |
| 4,540,382 A | 9/1985 | Wilson | |
| 4,766,967 A | 8/1988 | Slicker et al. | |
| 5,048,657 A | 9/1991 | Dissett et al. | |
| 5,052,244 A | 10/1991 | Kamiya et al. | |
| 5,337,848 A | 8/1994 | Balder | |
| 5,352,157 A | 10/1994 | Ochs et al. | |
| 5,495,924 A | 3/1996 | Shaw et al. | |
| 5,558,173 A | 9/1996 | Sherman | |
| 5,558,579 A | 9/1996 | Tsuchitya et al. | |
| 5,598,745 A | 2/1997 | Tsuchitya | |
| 5,735,768 A | 4/1998 | Sudau | |
| 5,856,709 A | 1/1999 | Ibaraki et al. | |
| 5,935,035 A | 8/1999 | Schmidt | |
| 5,993,350 A | 11/1999 | Lawrie et al. | |
| 6,041,901 A | 3/2000 | Werner et al. | |
| 6,176,808 B1 | 1/2001 | Brown et al. | |
| 6,364,773 B2 | 4/2002 | Abe et al. | |
| 6,394,924 B1* | 5/2002 | Schiebold et al. | 475/5 |
| 6,431,929 B2 | 8/2002 | Schafer et al. | |
| 6,582,312 B2 | 6/2003 | Suzuki et al. | |
| 6,601,682 B2 | 8/2003 | Lehmann et al. | |
| 6,668,953 B1* | 12/2003 | Reik et al. | 180/53.8 |
| 6,740,002 B1* | 5/2004 | Stridsberg | 477/14 |
| 2002/0177504 A1* | 11/2002 | Pels et al. | 477/3 |
| 2003/0127262 A1* | 7/2003 | Noreikat et al. | 180/65.2 |
| 2004/0204286 A1* | 10/2004 | Stridsberg | 477/14 |
| 2005/0250618 A1* | 11/2005 | Colvin et al. | 477/174 |

* cited by examiner

*Primary Examiner*—Sherry Estremsky
(74) *Attorney, Agent, or Firm*—David B. Kelley; Brooks Kushman P.C.

(57) ABSTRACT

A geared, power transmission mechanism for a hybrid electric vehicle wherein multiple power flow paths are established between an engine and vehicle traction wheels and between an electric motor and the vehicle traction wheels. A vibration damper assembly, including damper springs and motor inertia mass, is located at the torque output side of the electric motor, whereby inertia torsional vibrations are attenuated.

12 Claims, 6 Drawing Sheets

HYBRID AUTOMOTIVE POWERTRAIN WITH TORSIONAL VIBRATION DAMPER

CROSS REFERENCE TO RELATED APPLICATIONS

This application is a continuation-in-part of U.S. application Ser. No. 10/063,196, filed Mar. 28, 2002 now abandoned. It is a continuation-in-part also of U.S. application Ser. No. 10/463,046, filed Jun. 17, 2003 now abandoned. Applicant claims priority to those applications.

BACKGROUND OF INVENTION

1. Field of the Invention

The present invention relates to hybrid automotive powertrains, specifically in the area of vibration control.

2. Background Art

Torsional resonance vibration has always been an inherent problem with automobiles powered by an internal combustion engine because of engine inertia forces. Methods that have been devised to minimize this vibration usually involve adding a damper system, which uses an additional mass to absorb vibration forces.

The added mass of such damper systems minimizes vibrations, but it also adds extra weight to the automobile. The extra weight of a traditional damper system affects the automobile's performance and adds to its complexity.

The torsional resonance vibration is diminished in hybrid vehicles that are powered by an internal combustion engine and an electrical motor, but it is not eliminated. By tradition, the torsional vibration problem in a hybrid vehicle has been dealt with in the same way as in an internal combustion engine vehicle; i.e., by adding an extra mass to absorb vibration forces, even though a hybrid vehicle is built quite differently than a gasoline-powered automobile.

Generally, a hybrid electric vehicle combines an electric power source with a traditional internal combustion engine power source to achieve enhanced fuel economy and lower exhaust emissions. Electric propulsion typically has been generated through the use of batteries and electric motors. Such an electric propulsion system provides desirable characteristics of high torque at low speeds, high efficiency, and an opportunity to regeneratively capture otherwise lost braking energy.

Propulsion using an internal combustion engine provides high energy capability and enjoys an existing infrastructure and lower cost due to economics of scale. By combining the two power sources with a proper control strategy, the result is a reduction in the use of each power source in its less efficient range. Furthermore, in the case of a parallel hybrid configuration, the combination of a down-sized engine with an electric propulsion system results in better utilization of the engine, which improves fuel consumption. The electric motor and battery can compensate for reduction in the engine size.

In typical configurations, the combination of the two types of propulsion systems (internal combustion engine and electric) is usually characterized as either series or parallel hybrid system. In a pure series hybrid propulsion system, only the electric motor(s) is in direct connection with the drivetrain and the engine is used to generate electric power that is fed to the electric motor(s). The advantage of this type of system is that the engine can be controlled independently of driving conditions and therefore can be consistently run with optimum fuel efficiency and low emission levels. A key disadvantage to the series arrangement is the loss of energy experienced because of the inefficiencies associated with full conversion of mechanical engine output energy to electrical energy.

In a pure parallel hybrid propulsion system, both the engine and the electric motor are directly connected to the drivetrain, and either one may independently drive the vehicle. Because there is a direct mechanical connection between the engine and the drivetrain in a parallel hybrid propulsion system, less energy is lost through conversion to electricity compared to a series hybrid propulsion system. The operating point for the engine, however, cannot always be chosen with full freedom.

The two hybrid propulsion systems can be combined into either a switching hybrid propulsion system or a parallel-series hybrid propulsion system. A switching hybrid propulsion system typically includes an engine, a generator, a motor, and a clutch. The engine is typically connected to the generator. The generator is connected through a clutch to the drivetrain. The motor is connected to the drivetrain between the clutch and the drivetrain. The clutch can be operated to allow series or parallel hybrid propulsion.

A parallel-series hybrid system, as in the case of the present invention, includes an engine, a generator, and a motor. A planetary gear set allows a series power flow path from the engine to the generator and a parallel power flow path from the engine directly to the drivetrain. In a parallel-series hybrid system, the engine speed can be controlled by way of the series power flow path, while maintaining a mechanical connection between the engine and drivetrain through the parallel path. The motor augments the engine power in the parallel path, as in the case of a traction motor in a pure parallel hybrid propulsion system, and provides an opportunity to use energy directly through the series path, thereby reducing the losses associated with converting the electrical energy into and out of chemical energy from the battery.

In a typical parallel-series hybrid system, the generator is connected to the sun gear of the planetary gear set. The engine is connected to the planetary carrier. The output gears, usually including an output shaft and gears for connecting the motor and the final drive, are connected to the ring gear. In such a configuration, the parallel-series hybrid system generally operates in four different modes; one electric mode and three hybrid modes.

In the electric mode, the parallel-series hybrid system propels the vehicle using only stored electrical energy and the engine is turned off. The tractive torque is supplied from the motor, the generator, or a combination of both. This is the preferred mode when the desired power is low enough so that it can be produced more efficiently by the electrical system than by the engine when the battery is sufficiently charged. This is also a mode for reverse driving because the engine cannot provide reverse torque to the powertrain in this configuration.

In the parallel hybrid mode, the engine is operating and the generator is locked. By doing this, a fixed relationship between the speed of the engine and the vehicle speed is established. The motor operates as a motor to provide tractive torque to supplement the engine's power, or it can be operated to produce electricity as a generator. This mode is used whenever the required power demand requires engine operation and the required driving power is approximately equal to an optimized operating condition of the engine. This mode is especially suitable for cruising speeds. It is maintained by a small internal combustion engine fitted to the hybrid electric vehicle.

In a parallel-series hybrid mode, the engine is on and its power is divided between a direct mechanical path to the drivetrain and an electrical path through the generator. The engine speed in this mode is typically higher than the engine speed in the parallel mode, thus effecting higher engine power. The electrical energy produced by the generator can flow to the battery for storage or to the motor for immediate use. In the positive parallel-series mode, the motor can be operated as either a motor to provide tractive torque to supplement the engine's power or to produce electricity in combination with the generator. This is the preferred mode whenever high engine power is required for tractive powering of the vehicle, such as when high acceleration is called for; e.g., in passing or uphill ascents. This is a preferred mode used when the battery is charging.

In a negative parallel-series hybrid mode, the engine is in operation and the generator is used as a motor acting against the engine to reduce its speed. Consequently, engine speed, and therefore engine power, is lower than engine speed in a parallel mode. If needed, the motor can also be operated to provide tractive torque to the drive-train or to generate electric power therefrom. This mode is typically never preferred due to increased losses at the generator and planetary gear system, but it will be utilized when engine power is required to be decreased below that which would otherwise be produced in parallel mode. This situation will typically be brought about because the battery is in a well-charged condition and there is low tractive power demand. In this regard, whether operating as a generator or motor, the torque output of the generator is always of the same sense (+/−); that is, the torque is always directionally opposed to that of the engine. The sign of the speed of the generator, however, alternates between negative and positive values depending upon the direction of rotation of its rotary shaft, which corresponds to the generator mode versus the motor mode. Because power is dependent upon the sense of the speed (torque remains of the same sense), the power will be considered to be positive when the generator is acting as a generator and negative when the generator is acting as a motor.

When slower engine speed is desired, the current supplied to the generator is changed, causing the speed of the generator to slow. This in turn slows the engine. This effect is accomplished because the resistive force acting against the torque of the generator is less at the engine than at the driveshaft, which is connected to the wheels and is influenced by the entire mass of the vehicle. It should be appreciated that the change in speed of the generator is not equal, but instead proportional to, that of the engine because of gear ratios involved in the connection therebetween.

Typically, to achieve a smooth engine start in a hybrid electric vehicle in which the engine is mechanically interconnected to the drive wheels, the start of engine fuel injection and ignition is made at speeds above any mechanical resonance speeds of the drivetrain. Additionally, at full take-off acceleration, any delay in the engine's production of power typically decreases engine performance. Still further, to achieve smooth driving characteristics and obtain low fuel consumption, the engine torque and speed change rates must be limited. At full take-off, this usually results in an increased time for the engine to reach maximum power, and all of these conditions deteriorate acceleration performance of the vehicle.

As can be appreciated, the engine is not always running during vehicle operation. If the engine is stopped for a sufficiently long period during operation of the vehicle, the exhaust system catalyst may cool down to such a degree that a temporary, but significant, increase in exhaust emissions may occur upon restart until the catalyst once again warms to its effective temperature.

In a typical parallel-series hybrid electric propulsion arrangement, the control strategy involves operating the engine along optimum efficiency torque versus speed curves. A trade-off exists between traction force performance and fuel economy that, for optimization, typically requires selection of a particular gear ratio between the engine and the wheels that causes the engine to deliver more power than is needed for vehicle propulsion. This generally occurs during cruising in parallel mode, or near constant vehicle velocity conditions. Operation under these conditions can sometimes cause the battery and charging system to reject energy being delivered thereto from the engine. This problem is generally solved by decreasing or limiting the engine output power by entering negative split mode that entails using the generator as a motor to control the engine to a decreased speed. Such control allows the engine to follow an optimum curve at reduced engine output power.

Use of the generator as a motor gives rise to power circulation in the powertrain, which leads to undesirable energy losses at the generator, motor, inverters and planetary gear set. These energy losses may be manifest as heat generation, which indicates that most efficient use is not being made of the installed drivetrain.

In a parallel-series hybrid propulsion system having one or more planetary gear sets and utilizing a generator lock-up device, harshness in ride occurs when the generator lock-up device is engaged and released. This is due primarily to the difference in how the engine torque is estimated when the vehicle operates in different operating modes. Typically, when the generator is locked-up, engine torque is estimated from the combustion control process of the engine. When the generator is free, however, as in a parallel-series mode, engine torque is estimated from the generator torque control process. The difference in values of these two estimating techniques gives rise to what usually amounts to a variation in operating torque between the engine and generator when the lock-up device is engaged or disengaged, thereby creating harshness in the vehicle's operation, usually manifest as abrupt changes or jerkiness in the vehicle's ride.

The generator is typically used to control the engine in a parallel-series hybrid mode. This is usually accomplished by employing a generator having maximum torque capabilities substantially greater than the engine's maximum torque that is transmittable to the planetary gear system. Failure to have such a control margin can result in generator over-speed and possible damage to the propulsion system. Such a control margin means, however, that the engine and generator are not fully exploited at full capacity acceleration.

There are several deficiencies associated with the use of known hybrid electric vehicle designs described above, and one of them is related to torsional resonance vibrations.

Torsional vibration is caused, among other reasons, by the unevenness of crankshaft rotation for an internal combustion engine and consequent rotation of the drivetrain. The torsional vibration may comprise an entire spectrum of vibrations of different frequencies and may resonate with the natural frequency of the body of a vehicle. The torsional resonance vibrations that are in the driving range create a vibration or a noise that is objectionable to drivers and passengers.

One way to move these resonance vibrations out of a critical driving range is the use of an auxiliary damper, usually located on the driveshaft, which is commonly known as prop-shaft damper. This auxiliary damper comprises a torsional spring and a mass. It can be tuned to a specific frequency. This combination of torsional springs and masses adds weight to a vehicle and increases its cost. The added weight has a direct adverse effect on the fuel consumption.

The additional weight is especially undesirable in hybrid vehicles because of limited power provided by the electrical motor. Hybrid vehicles tend to be less heavy when compared to a vehicle propelled by a traditional internal combustion engine, so the hybrid vehicles can have better performance with an electrical motor. Any additional weight will affect this performance objective.

Therefore, a better solution to this torsional resonance vibration is clearly needed.

SUMMARY OF INVENTION

Briefly described, the present invention comprises an auxiliary damper system for hybrid vehicles. The auxiliary damper system according to the present invention replaces the traditional spring-mass combination damper system installed along a driveshaft with a system installed adjacent to an electrical motor. It uses no additional mass. The auxiliary damper system uses inertia of an electrical motor in combination with springs to reduce torsional resonance vibration.

The auxiliary damper system according to the present invention eliminates the traditional spring-mass damper system in the driveshaft and places a spring-motor-inertia damper system adjacent to the electrical motor, also known as a traction motor, of a hybrid vehicle. The spring-motor-inertia damper system is placed adjacent to the electrical motor.

The electrical motor is connected to two cover plates that are separated from each other by spacer bolts. The motor is connected to the cover plates through a hub and splines in a construction similar to a clutch disc. The cover plates have indentations for holding coil springs. A flange is placed between two cover plates and attached through a hub and splines to a shaft that is connected to a transmission shaft. The motor inertia thus is not directly linked to gear inertias but rather through several coil springs that are less stiff than the shaft.

The spring-motor-inertia system can be tuned to the natural frequency of the vehicle. The tuning is done by adjusting the spring rate. By adjusting the spring rate, the natural frequency of the combination spring and motor inertia can be placed within the driving range. The inertia created can counteract torsional resonance vibration in the driving range, thereby greatly reducing vibrations.

DETAILED DESCRIPTION

Figure 1:
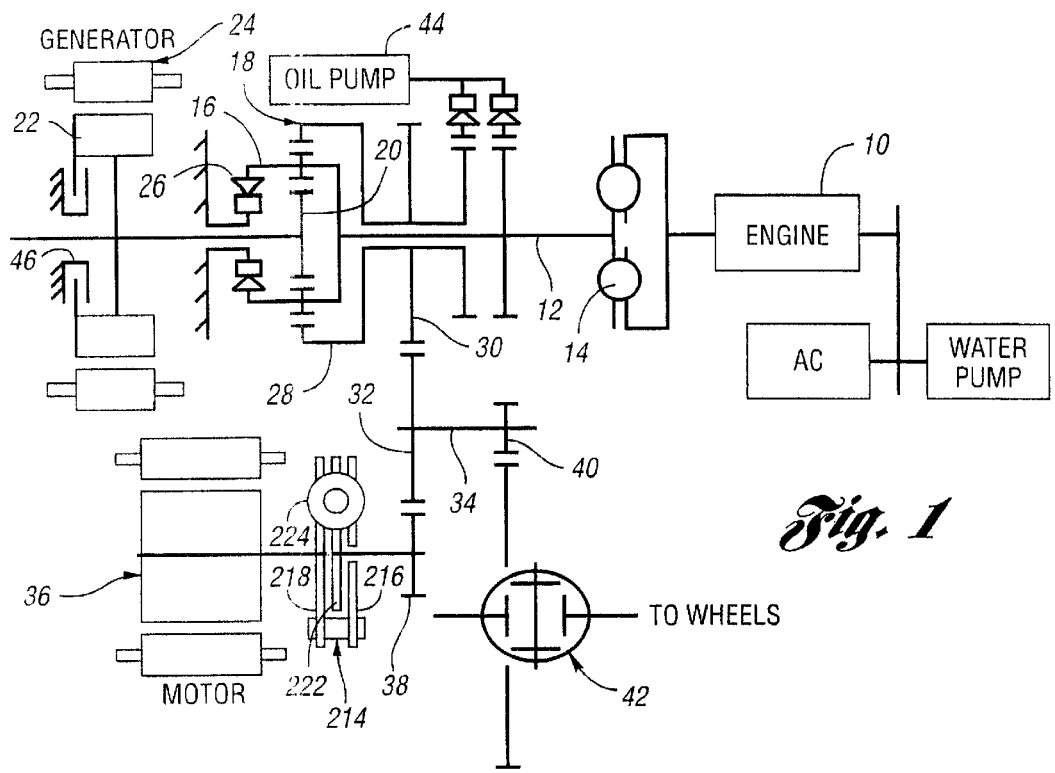
FIG. 1 is a schematic representation of a parallel-series hybrid electric vehicle powertrain with a damper system on the output side of an electric motor.

FIG. 1 shows a gearing arrangement for a front wheel, parallel-series gear system.

Although several of the gearing arrangements of the various disclosed embodiments of the invention are intended for front wheel drive vehicles, the invention may be used in other configurations as well, including rear wheel drive vehicles and all-wheel drive vehicles.

In FIG. 1, engine 10 is connected to transmission input shaft 12 through a mechanical spring damper assembly 14. Shaft 12 is connected to the carrier 16 of a planetary gear unit 18. The sun gear 20 of the gear unit 18 is connected to the rotor 22 of an electric generator 24. An overrunning coupling or brake 26 prevents the carrier 16 and the engine from being driven with reverse motion while allowing the generator to deliver torque to the wheels when the engine is turned off.

The ring gear 28 of planetary gear unit 24 is connected to engine countershaft drive gear 30 and to countershaft gear 32, thus driving the intermediate shaft 34. An electric traction motor 36 is drivably connected to the intermediate shaft through gears 38 and 32. Countershaft gear 40 meshes with the ring gear of a differential-and-axle assembly 42 for the traction wheels. A transmission oil pump 44 is drivably geared to shaft 12.

When a vehicle with the transmission arrangement shown in FIG. 1 is in a highway cruise mode, the generator brake 46 can be applied. This establishes a geared connection between the engine driven shaft 12 and the differential-and-axle assembly 42.

If the generator brake is applied, the power flow path is fully mechanical. The power source can be fully electrical if the vehicle is launched from a standing start with the engine off. A positive distribution of power occurs when the generator develops torque and the motor is motoring. When the motor absorbs torque and the generator is motoring, a negative power distribution occurs. In both positive power distribution and negative power distribution, a part of the energy is transferred electrically and part is transferred mechanically.

Figure 2:
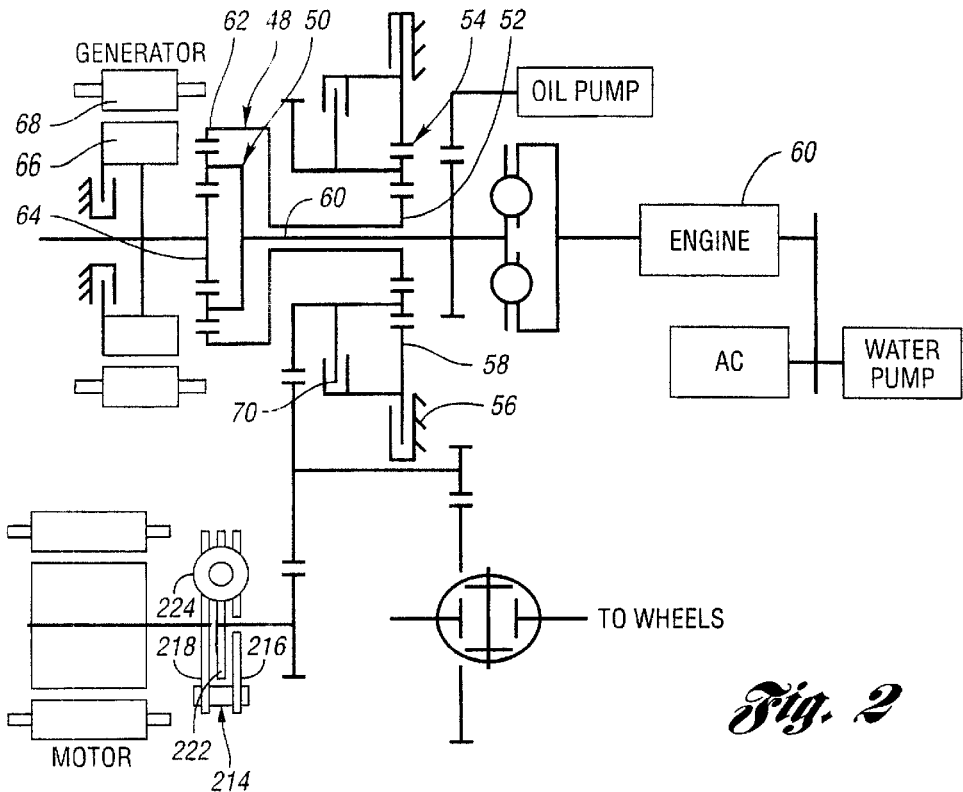
FIG. 2 is a schematic representation of a parallel-series hybrid electric vehicle powertrain drive with multiple-ratios and with a damper system on the output side of an electric motor.

In the embodiment of the invention shown in FIG. 2, the engine power flow path can be shifted using a planetary gear set, but the power delivery path for the motor is not shifted. In FIG. 2, there are two planetary gear units rather than a single planetary gear unit, as in the gearing arrangement of FIG. 1. The output of the first planetary gear unit shown at 48 is the ring gear 50. Sun gear 52 of a second planetary gear unit shown at 54 is connected to the ring gear 50. An underdrive brake 56 provides a reaction point for ring 58 of gear unit 54. The engine 60 then is drivably connected to the output shaft with a torque multiplying ratio as the engine driven shaft 60 delivers torque through gear unit 48 to ring gear 62. Sun gear 64 of gear unit 48 is connected to the rotor 66 of the generator 68.

A clutch 70 is located between the carrier of gear unit 54 and the ring gear 58. When the clutch 70 is engaged, the engine is connected to the output shaft with lower torque multiplication.

Figure 2A:
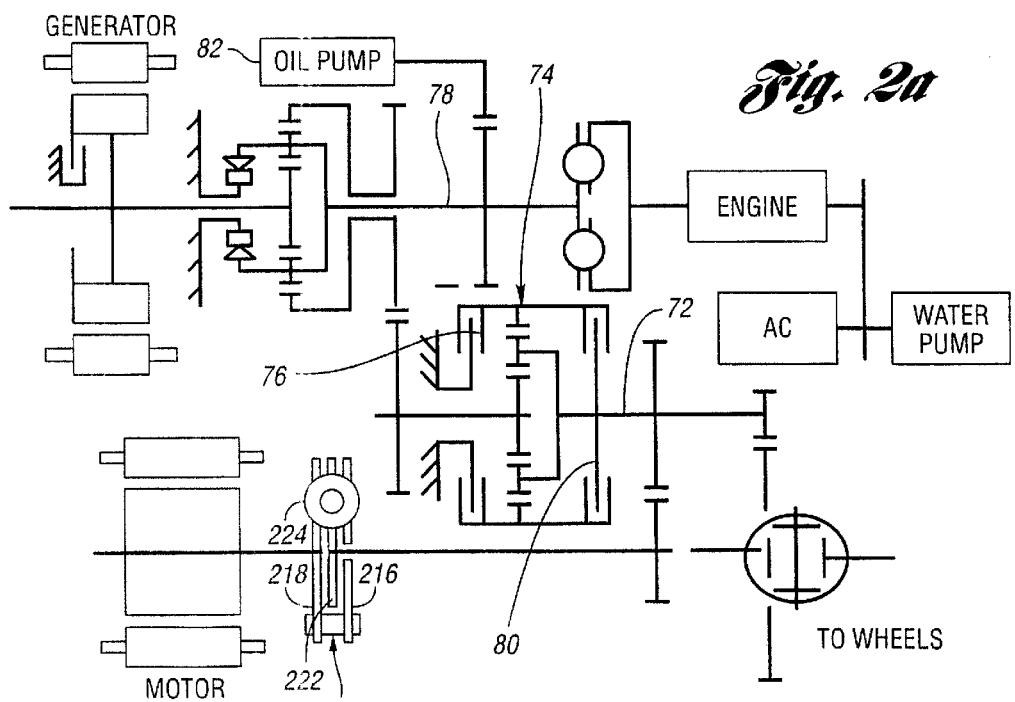
FIG. 2a is a schematic representation of a powertrain for a hybrid electric vehicle with a planetary gear set on an intermediate axis between the engine axis and the motor axis and with a damper system on the output side of an electric motor.

In the embodiment of FIG. 2a, the power flow path for the engine, as in the case of the gear arrangement of FIG. 2, can be shifted, but the power flow path for the motor cannot be shifted. In the case of the arrangement of FIG. 2a, however, the shifting of the power flow path for the engine occurs on a different axis; namely, the axis of countershaft 72.

A planetary gear unit 74 is mounted on the axis of countershaft 72. Gear unit 74 is comparable to gear unit 54 of the arrangement of FIG. 2. It includes a brake 76, which can be applied to establish a first gear ratio in the power flow path between engine driven shaft 78 and the countershaft 72. When the brake 76 is released and clutch 80 is applied, the gear ratio for gear unit 74 is unity.

The clutch 76 can be open in a first default mode or closed in a second default mode. A default closed mode allows the engine to be started without hydraulic pressure being available from the pump 82. A default open mode requires hydraulic pressure to be developed as the motor drives the pump 82.

Figure 2B:
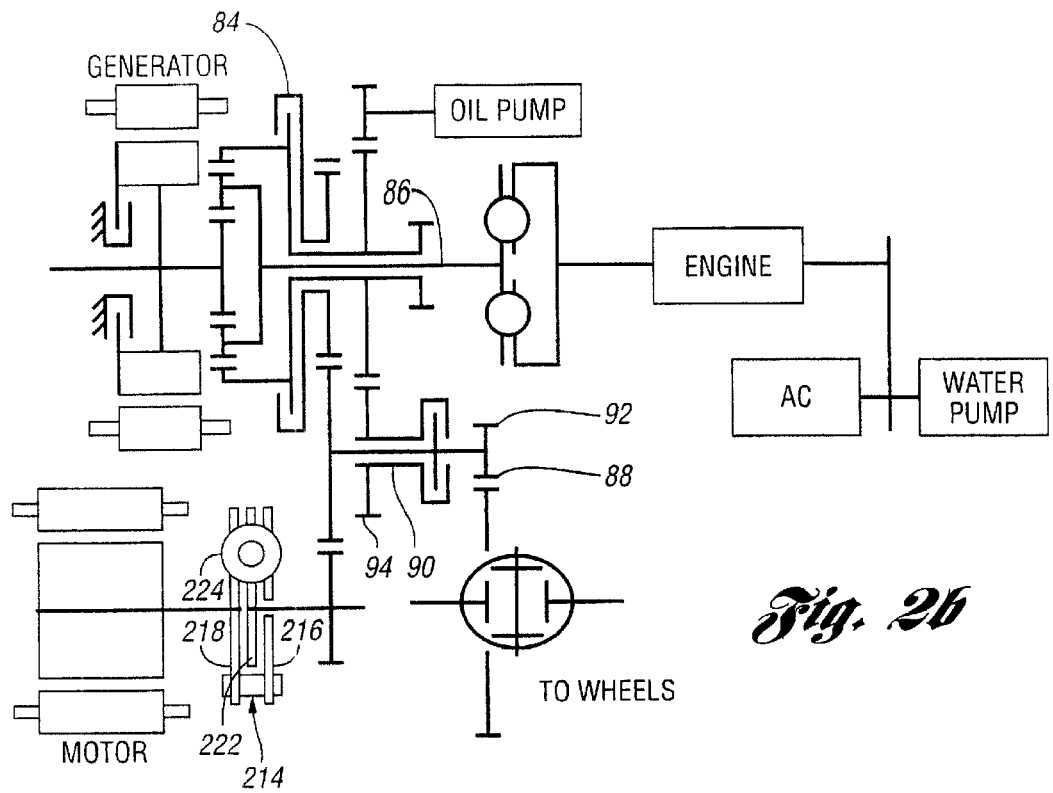
FIG. 2b is a schematic representation of a hybrid electric vehicle driveline with multiple-ratios without a planetary gear unit on a third axis between the engine axis and the motor axis and with a damper system on the output side of an electric motor.

In the embodiment of FIG. 2b, the power flow path for the engine can be shifted, whereas the power flow path for the motor cannot be shifted. In the case of the arrangement of FIG. 2b, however, the power flow path for the engine can be shifted without the use of a planetary gear unit on the countershaft axis, as in the case of the gear arrangement of FIG. 2a.

In the gear arrangement of FIG. 2b, a friction clutch 84 is applied to establish a first ratio in the torque flow path for the engine driven shaft 86. When the clutch 84 is applied, the engine driven shaft 86 is connected to the output shaft with a gear ratio for reduced torque multiplication. A clutch 88 on the axis of the countershaft 90 can be applied to connect the engine to the output shaft with increased torque multiplication. Since the pitch diameter of countershaft gear 92 is smaller than the pitch diameter of countershaft gear 94, the design of FIG. 2b requires less space than the design of FIG. 2a because of the absence of planetary gearing on the countershaft. This increases the possibility for improved packaging of the transmission in a vehicle powertrain.

During the shift, in the case of FIGS. 2, 2a and 2b, motor torque fills any "torque hole" in the engine torque flow path. Thus, the shift is done at a point when there is reserve motor torque.

Figure 3:
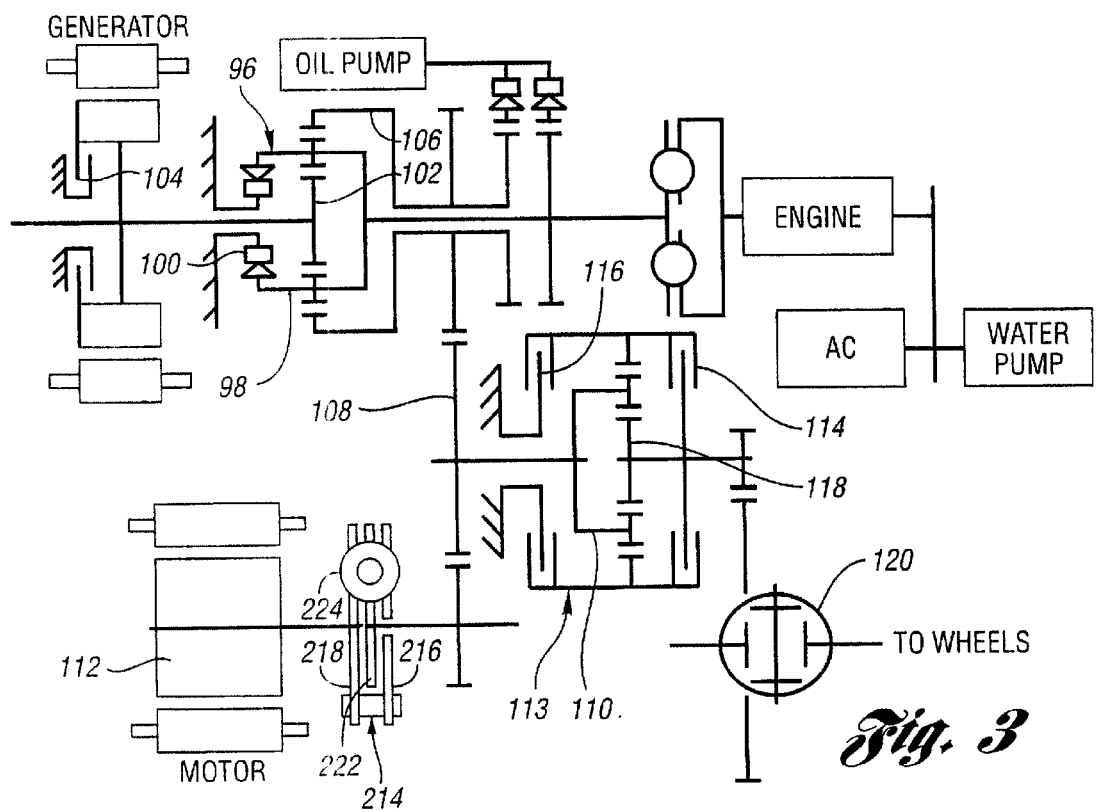
FIG. 3 is a schematic representation similar to FIG. 2a, but the power flow path for the motor has multiple-ratios.

In the embodiment of FIG. 3, the power flow path for both the motor and the engine can be shifted. In this respect, it differs from the embodiments shown in FIGS. 2, 2a and 2b.

In the embodiment of FIG. 3, a first planetary gear unit 96 is comparable to the planetary gear unit 48 of the arrangement shown in FIG. 2. In the case of FIG. 3, the carrier 98 is braked by overrunning coupling 100. Sun gear 102 of gear unit 96 is braked by generator brake 104 to establish a first gear ratio as torque is delivered from ring gear 106 to countershaft gear 108, which drives the carrier 110 of second planetary gear unit 112.

When the motor 112 is acting as a power source, carrier 110 is driven by the motor and the output gear of the planetary gear unit 110 is the sun gear 118, which drives the differential-and- axle assembly 120. The gear ratio for the planetary gear unit 113 can be shifted to a ratio of unity by engaging clutch 114. Reaction brake 116, when the clutch 114 is disengaged, supplies a reaction point for the gear unit 112. Thus, in the case of FIG. 3, both the power flow path for the motor and the power flow path for the engine can be shifted between two driving ratios, thereby providing additional flexibility to the powertrain.

Figure 3A:
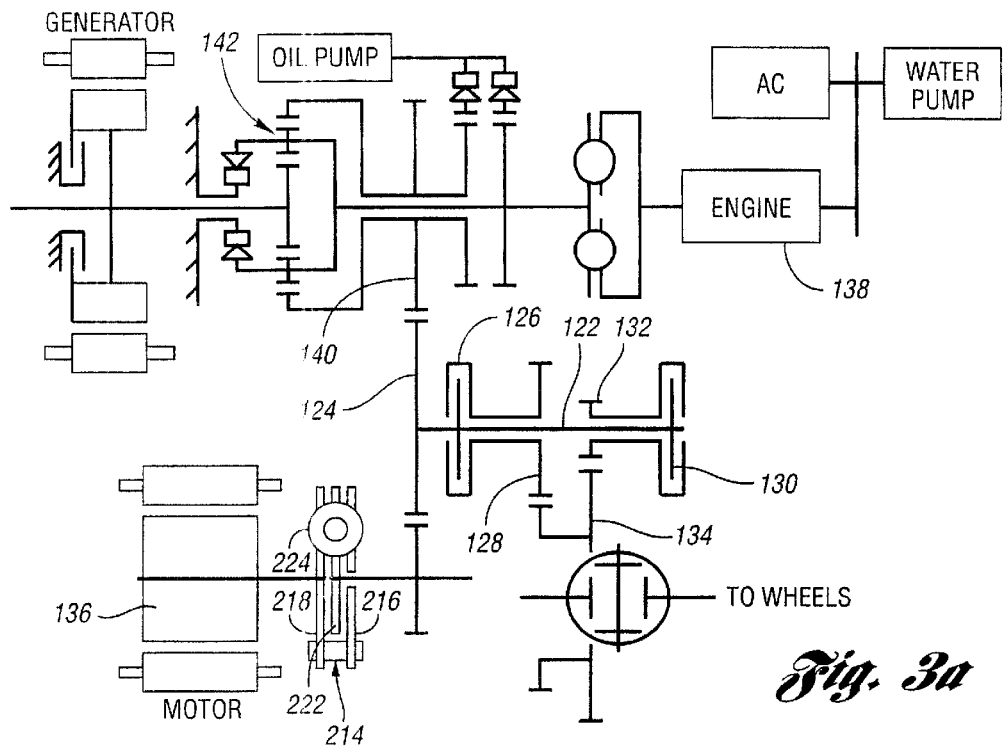
FIG. 3a is a schematic representation similar to FIG. 3, but the gearing in the power flow path for the motor is not a planetary gear unit as in the case of FIG. 3.

In the embodiment of FIG. 3a, it is possible to provide two ratios without the need for a second planetary gear set on the countershaft axis. A portion of the gear arrangement of FIG. 3a on the engine axis is similar to the gear arrangement of FIG. 2a. The arrangement of FIG. 3a is similar also to the arrangement of FIG. 3 because it makes available two ratios for the output gear. Unlike the arrangement of FIG. 3, however, the two ratios for the output gear are achieved without the need for a planetary gear unit on the countershaft axis.

In the arrangement of FIG. 3a, a countershaft assembly 122 is connected to countershaft gear 124.

In FIG. 3a, countershaft gear 124 can be selectively connected to the countershaft gear 128 by clutch 126. This establishes a first gear ratio. A second countershaft clutch 130 can be engaged to establish a driving connection between a smaller diameter countershaft gear 132 and the differential-and-axle gear 134. Motor torque from motor 136 is delivered through the countershaft assembly 122 through either clutch 126 or 130. Likewise, the power flow path from the engine delivers torque to countershaft gear 124 and that torque, in turn, is delivered through either clutch 126 or clutch 130 to the traction wheels. Thus, the engine torque is delivered through the same torque flow path as motor torque. Both the engine and the motor have the same two ratios. In order to shift ratios in the power flow path, the engagement and release of clutches 126 and 130 must be synchronized to avoid a torque reduction at the wheels.

As in the case of the previous embodiments, engine 138 drives torque transfer gear 140 as torque is delivered through planetary gear unit 142 located on the engine axis.

Figure 3B:
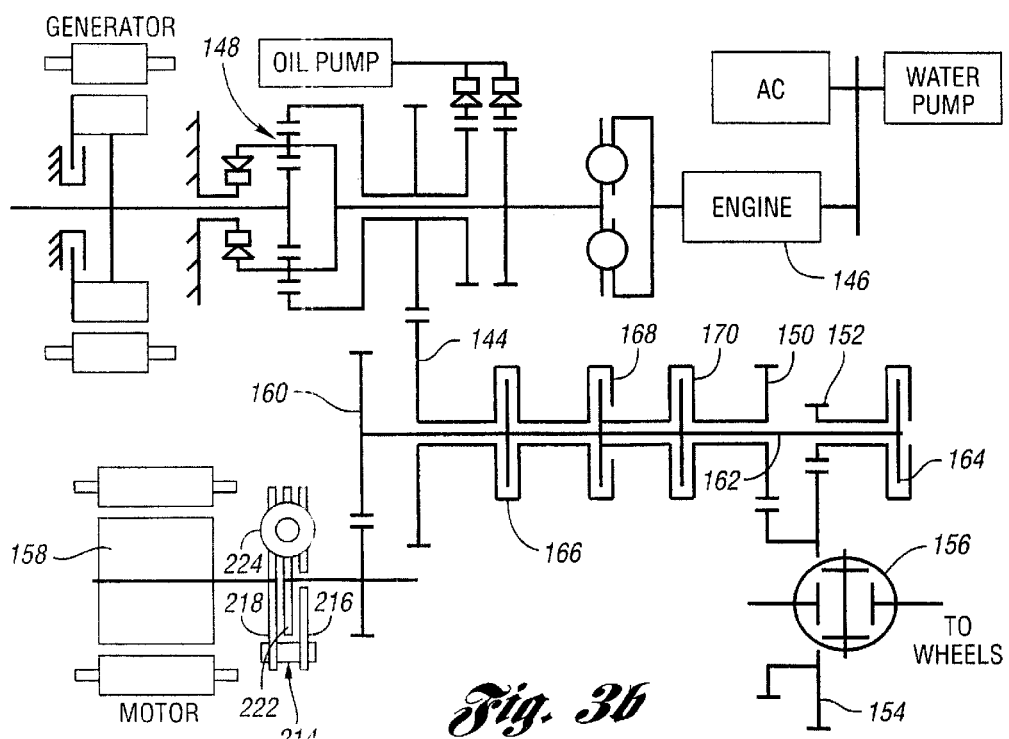
FIG. 3b is a schematic representation of a gearing arrangement for a hybrid electric vehicle having an additional multiple-ratio torque output gear with multiple clutches to achieve smooth shifts.

In the embodiment of FIG. 3b, the kinematics involved are similar to the kinematics involved in the arrangement of FIG. 3a. In the case of the arrangement of FIG. 3b, engine power is delivered to countershaft gear 144 from engine 146 through the planetary gear unit 148. Countershaft gear 150 and a smaller diameter countershaft gear 152 each drive a differential carrier gear 154 of the differential-and-axle assembly 156. Motor power from motor 158 drives countershaft gear 160, which drives countershaft 162. Countershaft 162 is connected to the differential-and-axle assembly 156 through selectively engageable clutches 164 and 170. Engine power can be delivered to the countershaft 162 through selectively engageable clutch 166. If countershaft clutch 168 is engaged, engine power can be delivered to countershaft gear 150.

With the arrangement shown in FIG. 3b, the gear ratio in the power flow path between the engine and the wheels can be changed independently of the gear ratio in the power flow path between the motor and the wheels. Thus, the motor can provide torque to the wheels during a ratio shift in the engine torque flow path and the engine can deliver torque to the wheels during a ratio shift in the motor torque flow path. Smoother ratio shifts then can be achieved because one power source can provide torque during a shift interval that occurs in the power flow path for the other power source.

In a launch mode, clutch 164 would be closed and clutch 166 would be closed. When a shift is desired, clutch 166 is opened and clutch 168 is closed, which would cause engine power to flow through the new ratio and motor power to flow through the old ratio. Clutch 164 would be opened and clutch 170 would be closed, which would shift the motor power flow path to the new ratio.

Another advantage of the gear arrangement of FIG. 3b, which is true also of the gear arrangements of FIGS. 3 and 3a, is that the vehicle is capable of having a true neutral gear. That is, the motor and the engine can be completely disconnected from the driveshaft by disengaging the clutches in the power flow path between the wheels and each power source. This feature has advantages during operation of an automatic brake system and during hard-braking events for the vehicle because the overall powertrain inertia that must be overcome by the friction elements of the braking system is reduced as the transmission rapidly cycles into and out of the neutral state during a braking event.

Figure 3C:
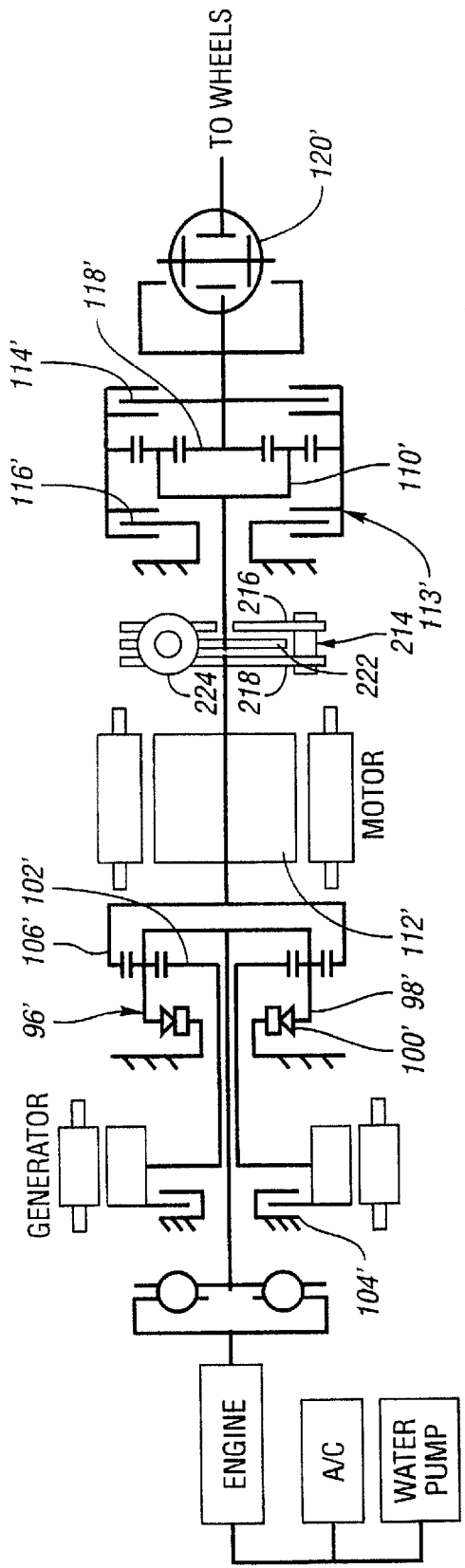
FIG. 3c is a schematic representation of a gearing arrangement for a rear wheel drive vehicle.

The embodiment of the invention shown in FIG. 3c is intended for rear wheel drive vehicles. It includes elements that correspond to elements in the embodiment of FIG. 3. The elements in FIG. 3c that have a counterpart in the embodiment of FIG. 3 are identified by the same reference numerals although prime notations are used with the numerals in FIG. 3c.

The planetary gear unit 113' of FIG. 3c is located on a common axis for the motor 112' and the engine rather than on a countershaft axis as in the case of the gearing of FIG. 3. In FIG. 3c the motor 112' is directly connected to carrier 110', whereas the motor 112 of FIG. 3 is connected to carrier 110 through countershaft gearing 108.

Figure 4:
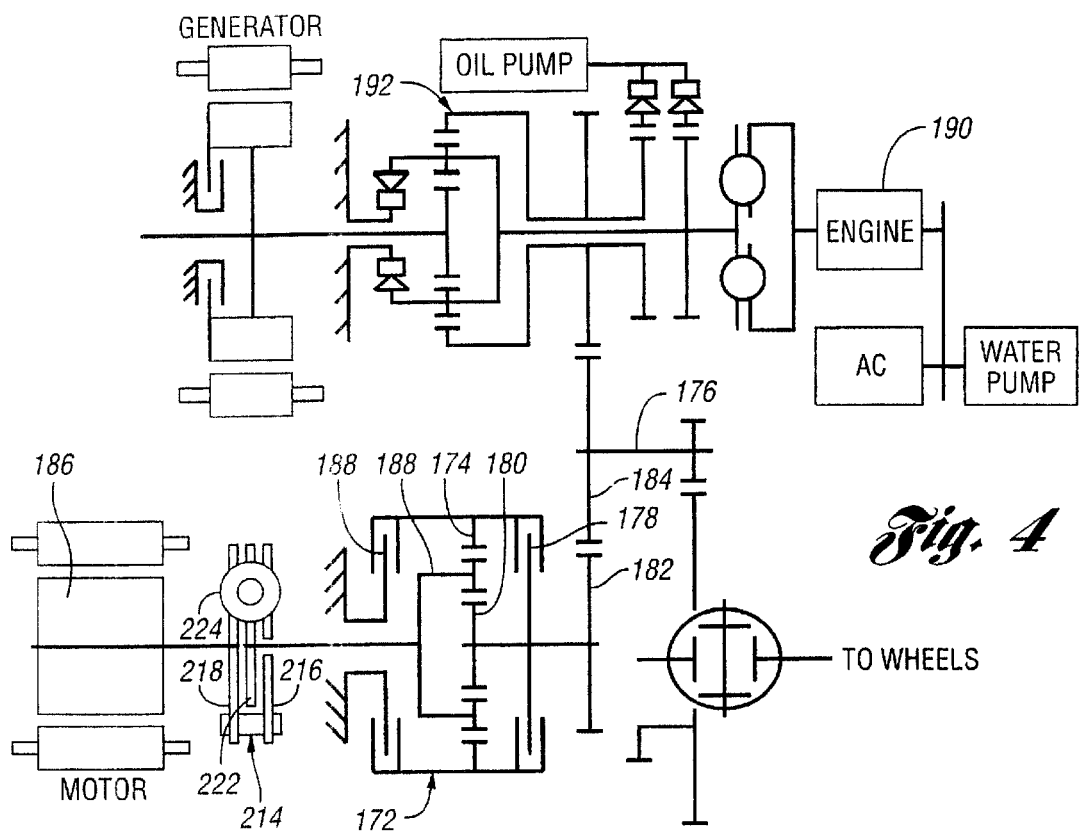
FIG. 4 is a schematic representation of a gearing arrangement for a hybrid electric vehicle having a planetary gear set on the axis of the motor.

In the embodiment of FIG. 4, a gearing arrangement is illustrated wherein an added planetary gear unit for the motor is used on the motor axis, as indicated at 172. The gear unit 172 is a planetary gear unit with a ring gear 174 that can be drivably connected to countershaft 176 when clutch 178 is engaged. Sun gear 180 is connected directly to gear 182, which drives countershaft gear 184. The motor 186 drives the carrier 188 of the planetary gear unit 172, and selectively engageable brake 188 anchors ring gear 174 to establish a gear ratio through the planetary gear unit 172 with the clutch 178 released. When the clutch 178 is applied and the brake 188 is released, the gear ratio at the planetary gear unit 172 is unity.

In the case of the gear arrangement of FIG. 4, only the power flow path for the motor can be shifted. The power flow path for the engine cannot be shifted. The distribution of power between the generator drive and the engine drive, as in the case of the previous embodiments, is achieved by planetary gear unit 192.

In the gearing arrangement of FIG. 4, the electric motor is connected through the planetary gear unit 172 to the traction wheels. The planetary gear units 172 and 192 are arranged such that by engaging clutch 188, a default gear ratio of around 3:1 to 4:1 is achieved. This gives the required launching torque at the wheels. At highway cruising speeds, the clutch 188 is disengaged and clutch 178 is engaged, which results in a gear ratio of 1:1. Thus, the maximum vehicle speed can be increased. Also, motor operation in the most efficient speed range can be chosen, thereby further improving fuel economy.

Figure 5:
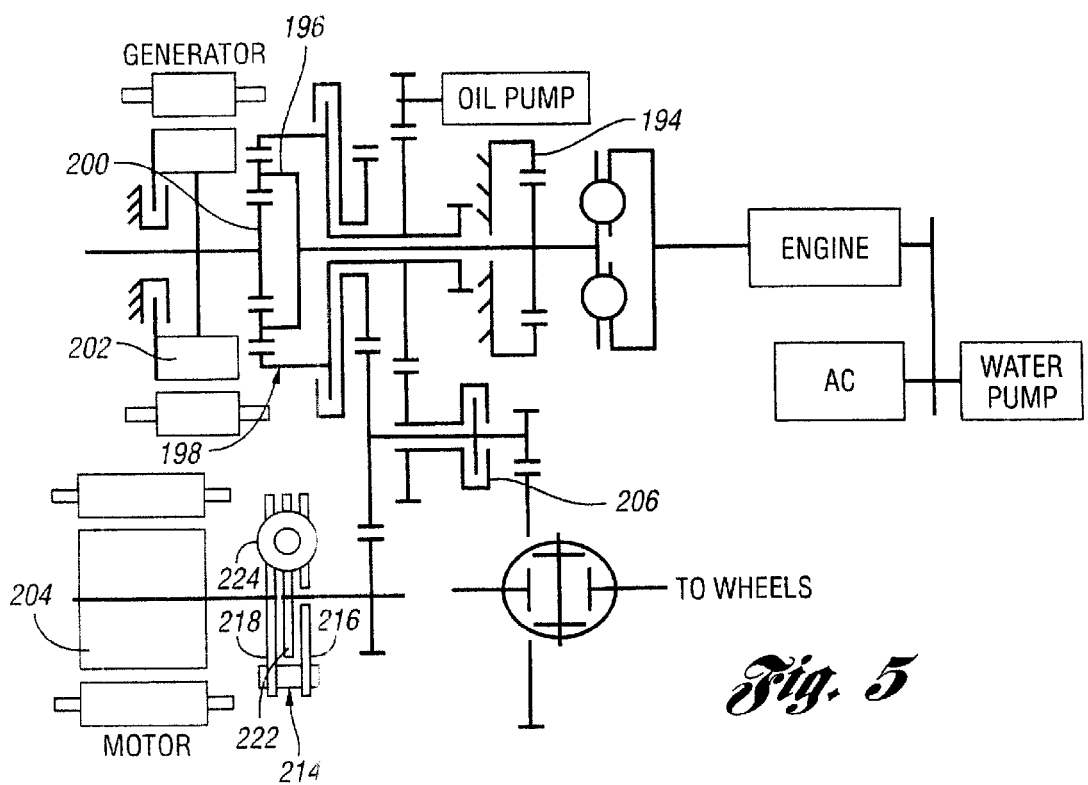
FIG. 5 is a schematic representation of a gearing arrangement for a hybrid electric vehicle in which a reaction brake is used on the engine as a generator delivers torque through a planetary gear unit to the traction wheels in an alternate drive mode, the motor being capable also of delivering torque to the traction wheels during reverse drive.

In the embodiment of FIG. 5, the gearing elements are arranged in a manner similar to the gearing arrangement of FIG. 2b. In the case of the design of FIG. 5, however, an extra brake 194 can be applied to anchor the engine crankshaft and to provide a reaction point for the carrier 196 of a power-split planetary gear unit 198. The sun gear 200 of the gear unit 198 is adapted to be driven by the rotor 202 of the generator. With the carrier 196 braked and with the engine disabled, a generator drive is established when the engine is non-functional. It also provides both forward drive and reverse drive modes. The motor 204 is drivably connected to the wheels through selectively engageable countershaft clutch 206 to achieve reverse drive during such alternate drive modes.

In FIG. 5, the brake 194 is open during forward drive operation, but it is closed in reverse drive operation. It is used also to provide reaction torque as the generator develops torque in the reverse direction. Thus, the generator can augment motor torque during reverse drive if that is desired. The same amount of power then can be transmitted, during operation in an alternate drive mode, to the wheels in both forward and reverse drive.

In selecting the ratios during a shift in the gearing arrangements of the invention, the overall system efficiency is achieved by choosing the appropriate generator and engine end-points. The shift between the two ratios is performed with hysteresis, which is required for desired drivability. The shift can be done either synchronously or non-synchronously.

Engine starting during normal operating conditions is done by spinning the generator to start the engine. The clutch "break-torque" is set so that the shock at the traction wheels during engine start is minimized while providing enough reaction torque for engine starting. The additional pressure at the clutch that is needed is provided by the engine-driven pump, which facilitates engine torque transfer to the wheels by providing added torque reaction. This is true of a default-closed high gear clutch.

In the case of a default-open clutch, engine starting can be done by modulating the pressure on the high ratio clutch to achieve full torque transfer.

The ratio shift from low to high must be scheduled at a higher vehicle speed than the electric drive speed so that the appropriate gear is set before the engine is shut-down. The high ratio clutch torque is adjusted to ensure a smooth engine shut-down by opening both clutches.

If the vehicle has traction control or automatic brake system control, powertrain inertia is reduced as much as possible by the gearing arrangements of the invention during traction control and automatic braking events. The reduced inertia also accommodates energy dissipation and reduces shock during these events.

During cold starts, in park, the high ratio clutch or the low ratio clutch can be opened, which permits the generator to be spun to a high speed. Then the clutch can be closed to provide starting inertia torque. This is a useful technique if the battery power limits are low.

Figure 1A:
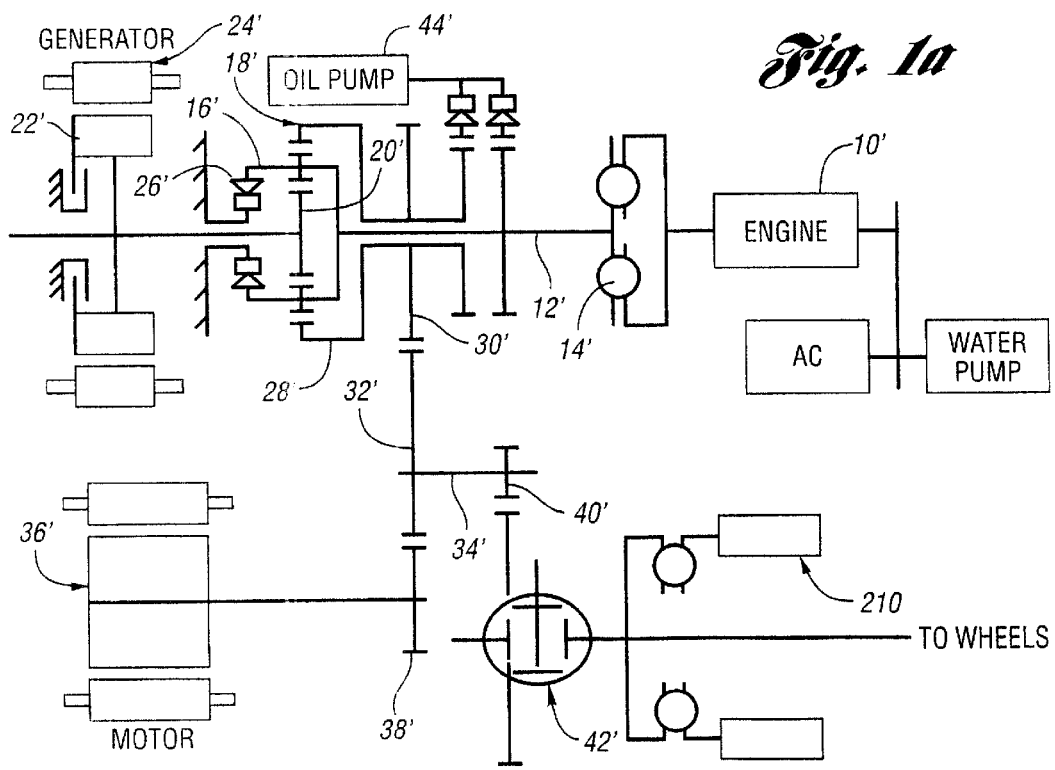
FIG. 1a is a schematic representation of a powertrain similar to the powertrain of FIG. 1 that does not embody the present invention and that includes a spring and mass damper arrangement on the transmission output shaft.

FIG. 1a is a schematic representation of a spring-mass damper system 210 located at the torque output side of a hybrid electric vehicle powertrain. For purposes of illustration, the gearing arrangement for the powertrain of FIG. 1a is similar to the gearing arrangement of the powertrain of FIG. 1. For this reason, the elements of the powertrain of FIG. 1a that have corresponding elements in the powertrain of FIG. 1 have been designated by the same numerals, although prime notations have been added to the numerals used in FIG. 1a.

In FIG. 1a, the engine crankshaft is coupled to the shaft 12' through a flywheel and spring damper assembly 14'.

The transmission system of FIG. 1a, which does not include features of the present invention, is susceptible to torsional resonance vibrations. The torsional resonance vibrations are caused mainly by the unevenness of the engine crankshaft rotation. This vibration affects the entire drivetrain, from the main shaft 12' to the gear system 18', to the gears 40' and 38', to the differential and axle assembly 42', and to the wheels. Transmission gearing rattling is made noticeable when the electrical motor 36' is not under any load, and this rattling is added to the vibrations and transmitted to the body of the automobile. Often these vibrations and rattling appear in a frequency range that falls within the driving range, especially for front wheel drive vehicles. The differential gear and axle assembly also can rattle for rear wheel drive vehicles.

The critical frequency for hybrid vehicles may lie around 1500 rpm (rotation per minute), which is the range of operation for the hybrid vehicles in hybrid operation when the engine 10' operates at the low speed and high torque condition. In this operating mode, the torsional resonance vibrations are more significant.

Traditionally, a spring-mass damper system, such as system 210 composed of springs and inertia masses, is placed along the output shaft to eliminate torsional resonance vibrations. The spring-mass damper system can be tuned to the natural frequency of the system to absorb vibration energy on the transmission output gearing and the driveshaft, and consequently the energy transferred to the wheels and to the body of the vehicle decreases. The tuning is accomplished through adjusting one or more of the masses, the spring rate, and/or the friction. The additional masses and springs increase the weight and the cost of the vehicle.

FIGS. 1 and 2–2b, 3–3c, 4 and 5, in contrast to FIG. 1a, illustrate systems according to the present invention. They illustrate a parallel hybrid vehicle with an electrical motor, where the motor inertia is attached to a damper instead of to transmission output gearing. A parallel hybrid vehicle has a gasoline engine and an electrical motor, and both power the vehicle. The electrical motor is a mass that hangs off the transmission output axis and that can be used to attenuate torsional resonance vibrations. The inertia of the motor rotor replaces the usual damper system mass, as the damper system of FIG. 1a.

A damper system 214 according to the present invention is introduced between the electrical motor and the transmission input side. The damper system 214 comprises two cover plates 216 and 218 separated by a plurality of spacer bolts 220. The electrical motor is connected through a hub ring and splines to the cover plates. A flange 222 is placed between the cover plates and the flange connects through another hub ring and splines to a motor output shaft, which is connected to the transmission input. Coil springs facilitate the relative movement between the flange and the cover plates. The coil springs 224 in the damper system can be steel coil springs or rubber springs, among other possibilities.

The spring-inertia damper system 214 is placed adjacent to the electrical motor and uses the inertia and the friction of the electrical motor to absorb vibration energy. The damper rate can be tuned to the vehicle's critical frequency and the damper torque capacity needs to be more than the electrical motor's torque.

The cover plates 216 and 218 generally have indentations for holding the coil springs 224, and the flange 222 has windows for locating the coil springs 224.

Engagement of the motor to the damper system is similar to a clutch engagement, and this engagement removes a direct connection between the inertia of the electrical motor and the inertias of the gear system and the engine. The inertia of the gear system and the engine thus is coupled to the electrical motor's inertia via the coil springs 224, which are less stiff than a shaft connection from the electrical motor.

The damper system 214 provides additional mass through the electrical motor and yet interfaces through less stiff members, i.e. coil springs, which lower the natural frequency to within a driving range.

Changing spring rate can adjust the natural frequency for the damper system 214.

Although embodiments of the invention have been described, it will be apparent that modifications may be made by persons skilled in the art without departing from the scope of the invention. All such modifications and equivalents thereof are intended to be covered by the following claims.

The invention claimed is:

1. A powertrain for a hybrid electric vehicle including an engine, an electric generator and an electric motor acting as a pair of power sources, the powertrain comprising:

gear elements establishing power delivery from the power sources to vehicle traction wheels;

the gear elements drivably connecting independently each power source to the traction wheels through first and second geared power flow paths; and a vibration damper assembly disposed between the motor and the gear elements, the damper assembly attenuating inertia torque fluctuation and torsional vibration as motor torque is delivered to the vehicle traction wheels.

2. A powertrain for a hybrid electric vehicle as set forth in claim 1 wherein:

the first geared power flow path is defined by a first gear unit;

a second gear unit;

the first gear unit having a sun gear connected to the generator, a carrier connected to the engine and a ring gear connected drivably to the second gear unit;

the engine defining one power source on an engine axis and the motor defining in part another power source on a motor axis; and a clutch and brake friction element sub-assembly for the second gear unit establishing selectively multiple gear ratios;

the driving connection between the motor and the traction wheels being through fixed ratio gear elements and the second gear unit being connected drivably to the traction wheels to complement motor driving power;

the driving connection between the motor and the traction wheels comprising a vibration damper assembly disposed between the motor and the second gear unit, whereby inertia torsional vibrations are attenuated.

3. The powertrain set forth in claim 2 wherein the first gear unit and the second gear unit are disposed on a common axis coinciding with the engine axis.

4. The powertrain set forth in claim 2 wherein the first gear unit is disposed on the engine axis and the second gear unit is disposed on an axis that is offset from and parallel to the engine axis.

5. A powertrain for a hybrid electric vehicle having an engine, an electric generator and an electric motor defining a pair of power sources, the powertrain comprising:

a planetary gear unit with a first planetary element connected drivably to the generator and a second planetary element connected drivably to the engine whereby a first power flow path to vehicle traction wheels is established;

a geared connection between the motor and the vehicle traction wheels, the geared connection defining a second power flow path that is independent of the first power flow path while sharing at least one gear element;

a clutch and brake friction element sub-assembly selectively establishing each of two gear ratios in the planetary gear unit; and a vibration damper assembly disposed between the motor and the geared connection between the motor and the vehicle traction wheels, the vibration damper assembly including damper springs and motor inertia mass.

6. The powertrain set forth in claim 5 wherein the geared connection comprises:

a countershaft on a countershaft axis spaced from and parallel to an axis for the engine and an axis for the motor;

the planetary gear unit having a high ratio power output gear element and a low ratio power output gear element; and a selectively engageable clutch on the countershaft axis to connect selectively the high ratio power output gear element and the low ratio power output gear element to the vehicle traction wheels.

7. The powertrain set forth in claim 6 wherein the countershaft has two gear elements of different pitch diameter;

the selectively engageable clutch on the countershaft axis connecting drivably the smaller of the two countershaft gear elements to the vehicle traction wheels to establish a first countershaft gear ratio;

the larger of the two countershaft gear elements being connected drivably to the vehicle traction wheels to establish a second countershaft gear ratio when the selectively engageable clutch on the countershaft axis is open.

8. A powertrain for a hybrid electric vehicle having an engine, an electric generator and an electric motor, the powertrain comprising:

a first planetary gear unit on an axis that is common to an engine axis, the engine being connected drivably to a torque input element of the first planetary gear unit;

a second planetary gear unit on a countershaft axis spaced from and parallel to both the engine axis and an electric motor axis, a torque output element of the second planetary gear element being connected drivably to vehicle traction wheels;

a torque input element of the second planetary gear unit being connected drivably to a torque output element of the first planetary gear unit;

a friction element sub-assembly establishing and disestablishing each of two gear ratios in the second gear unit whereby a ratio change occurs in a power flow path for the motor; and a vibration damper assembly including damper springs and motor inertia mass disposed between the motor and the second planetary gear unit, whereby inertia torsional vibrations are attenuated.

9. A powertrain for a hybrid electric vehicle having an engine, an electric generator, an electric motor and a planetary gear unit on an engine axis, the powertrain comprising:

a driving connection between the engine and a first element of the planetary gear unit, the generator being connected drivably to a second element of the planetary gear unit;

countershaft gearing comprising two countershaft gear elements mounted on a countershaft axis spaced from and parallel to a motor axis and the engine axis;

countershaft clutch means for establishing and disestablishing each of two gear ratios in the countershaft gearing;

the countershaft clutch means selectively connecting each countershaft gear element to vehicle traction wheels;

the motor being drivably connected through the countershaft clutch means to the countershaft gears and a torque output element of the planetary gear unit being drivably connected to the countershaft gearing through the countershaft clutch means; and a vibration damper assembly disposed between the motor and the countershaft gearing, whereby inertia torsional vibrations are attenuated.

10. A powertrain for a hybrid electric vehicle having an engine, an electric generator, and an electric motor, the powertrain comprising:

a planetary gear unit on an engine axis;

the engine being connected drivably to a first element of the planetary gear unit, the generator being connected drivably to a second element of the planetary gear unit;

countershaft gearing comprising at least two countershaft gear elements mounted on a countershaft axis spaced from and parallel to a motor axis and the engine axis;

countershaft clutches for selectively connecting each of the countershaft gear elements to vehicle traction wheels;

the motor being drivably connected through the countershaft clutches to the countershaft gears and a torque output element of the planetary gear unit being drivably connected to the countershaft gearing through the countershaft clutches; and a vibration damper assembly including damper springs disposed between the motor and the second planetary gear unit, whereby inertia of the mass of the motor rotor and the damper springs attenuate torsional vibrations.

11. The powertrain set forth in claim 10 wherein the countershaft clutches comprise multiple clutch elements in each of the power flow paths whereby engine power is available to complement motor power during a gear ratio change in the power flow path for the motor and motor power is available to complement engine power during a gear ratio change in the power flow path for the engine, thus effecting smooth gear ratio changes in the powertrain.

12. A powertrain for a hybrid electric vehicle having an engine, an electric generator and an electric motor, the powertrain comprising:

a first planetary gear unit on an axis that is common to an engine axis, the engine being connected drivably to a torque input element of the first planetary gear unit, the first planetary gear unit defining a first power flow path for the engine for driving the vehicle traction wheels;

a second planetary gear unit with a friction element sub-assembly for establishing and disestablishing each of two gear ratios in a second power flow path for the motor for driving the vehicle traction wheels; and a vibration damper assembly, including damper springs and motor inertia mass, disposed between the motor and the second planetary gear unit, whereby inertia torsional vibrations are attenuated.

* * * * *